Nov. 16, 1954  R. WINKLER ET AL  2,694,351
METHOD OF AND MACHINE FOR THE MANUFACTURE
OF ENVELOPES WITH GUMMED CLOSURE FLAPS
Filed Nov. 14, 1950  6 Sheets-Sheet 1

INVENTORS
RICHARD WINKLER AND
MAX DÜNNEBIER, DECEASED, BY
KURT DÜNNEBIER, ADMINISTRATOR
By [signature] Attorney.

Nov. 16, 1954

R. WINKLER ET AL 2,694,351

METHOD OF AND MACHINE FOR THE MANUFACTURE
OF ENVELOPES WITH GUMMED CLOSURE FLAPS

Filed Nov. 14, 1950

INVENTORS
RICHARD WINKLER AND
MAX DÜNNEBIER, DECEASED, BY
KURT DÜNNEBIER, ADMINISTRATOR

By Eameslixon Attorney.

Nov. 16, 1954                R. WINKLER ET AL                    2,694,351
              METHOD OF AND MACHINE FOR THE MANUFACTURE
                   OF ENVELOPES WITH GUMMED CLOSURE FLAPS
Filed Nov. 14, 1950                                      6 Sheets-Sheet 6

INVENTORS
RICHARD WINKLER AND
MAX DÜNNEBIER, DECEASED, BY
KURT DÜNNEBIER, ADMINISTRATOR

By James Dixon
         Attorney.

United States Patent Office 2,694,351
Patented Nov. 16, 1954

2,694,351

METHOD OF AND MACHINE FOR THE MANUFACTURE OF ENVELOPES WITH GUMMED CLOSURE FLAPS

Richard Winkler, Rengsdorf, and Max Dünnebier, deceased, late of Neuwied, Germany, by Kurt Dünnebier, administrator, Neuwied, Germany, assignors, by mesne assignments, to Berkley Machine Company, Kansas City, Mo., a corporation of Missouri Application November 14, 1950, Serial No. 195,512

Claims priority, application Germany November 18, 1949

18 Claims. (Cl. 93—63)

This invention relates to a method of, and machine for, the manufacture of envelopes with gummed closure flaps and relates more particularly to the manufacture of such envelopes directly from a web of paper fed from a roll.

One object of the present invention is to provide an improved method and machine whereby the web of paper is fed from a roll in one plane and is cut into separate blanks by rotary cutters so that the blanks are formed with straight edges and are subsequently cut for the removal of one or both of the ends of the side flaps and are then cut to form the corners to determine the shape of the envelopes, the blanks being then assembled in stepped formation for the application of the closure gum.

Still another object of the invention is to separate the blanks from the web after the cutting of the blanks by rotary cutters and to then convey the separated blanks in a different direction for the cutting of the ends of the side flaps and the formation of the corners for the folding of the flaps.

Still another object is to provide means whereby the separated blanks are fed in one direction and means whereby the blanks are released by such feeding means and are simultaneously gripped by means for feeding the blanks in a different direction to means for cutting the ends of the side flaps, for forming the corners for the folding of the flaps and for applying the closure gum by the wiping or roller method.

With these and other objects in view, this invention consists in the improved method of manufacture and in the novel construction and arrangement of parts of the machine as hereinafter described with reference to the accompanying drawings whereon:

Figure 1:
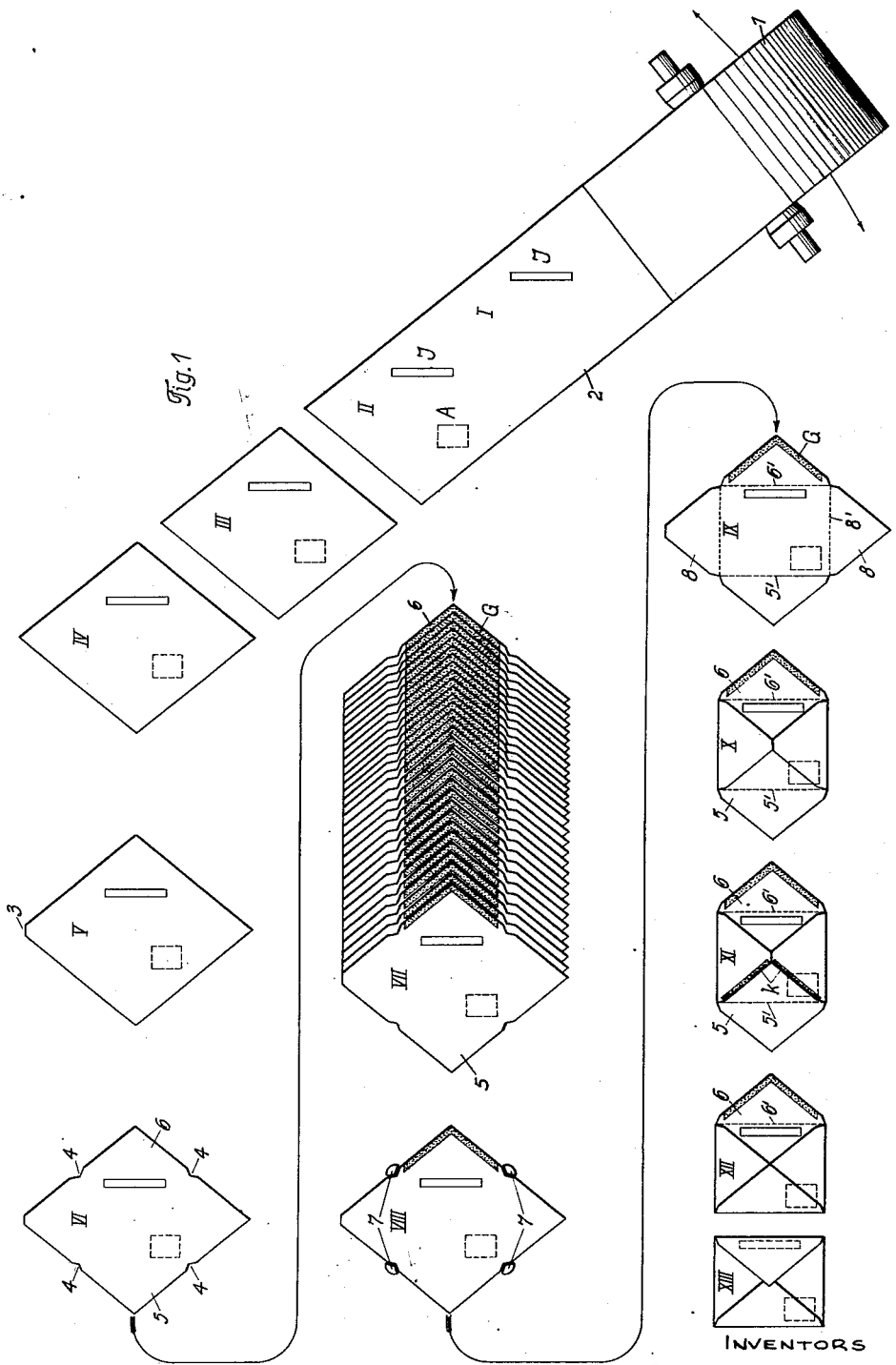
Fig. 1 is a diagram illustrating in plan the method in accordance with the invention.

The diagrammatic representation of the method, Fig. 1, shows how the individual steps of the manufacture of the envelope starts from the paper roll and terminates wth the finished envelope and shows how these steps follow one after the other successively. Assuming that the envelopes are each to receive a single-color outer and inner printing, there is first applied to the paper web 2 fed from the roll 1, the printing J for the inner surface of the finished envelope, corresponding to the step I, and then the printing A for the outer surface, corresponding to the step II. This sequence may, of course, be reversed, and one or both sides of the paper may be printed in two or more colors.

After the paper web 2 has received the desired imprints, the further steps proceed as follows, one after another, in accordance with the Roman reference numbers; in Fig. 1:

III. Cutting of separate sheets having straight edges from the web 2. The size of the sheet corresponds to the envelope which is to be produced and it may have the form of a rhombus or of a square;

IV. Passage of the sheet into other conveying mechanism;

V. Cutting of one or both side flap ends or tips 3. In the example shown it is assumed that only one of these ends is cut off;

VI. Cutting-out of the fold corners 4, whereby the envelope blank receives the final contour necessary for the folding and gumming;

VII. With the introduction of the blanks between a pair of conveyor belts, the formation of an assembly of blanks arranged in overlapping stepped relation to each other so that the bottom flaps 5 form the leading edges while the closure flaps 6 are so located with relation to each other that the exposed surfaces thereof receive the gum G for the closure flaps by utilization of the wiping or roller method and the stacked blanks are then fed in slightly less closely overlapping relation into another pair of conveyor belts by means of which they are conveyed through a drying channel for the drying of the closure flap gum;

VIII. Removal of each uppermost and leading blank from the stepped blanks and the engagement of each blank by the gauges 7 which swing into the fold corners 4;

IX. Scoring of the bottom and closure flap folds 5' and 6' respectively;

X. Folding the side flaps 8;

XI. Application of the gum $k$ for the sealing of the bottom flap;

XII. Folding over of the bottom flap 5 and its sealing to the side flaps 8;

XIII. Folding the closure flap 6.

In Figs 2 to 5 no attempt has been made to show the complete drive of the individual cylinders, belt drums and other parts, in order that these figures may be more readily understandable. The main drive of the entire machine is provided by the shaft 9 (Fig. 3) from which the longitudinal shaft 11, extending over the entire length of the machine, is driven by bevel gears 10, 10', and the individual stations of the machine are driven from said longitudinal shaft 11 at the proper places.

The path of the paper web 2 (Fig. 2) which is unwound from the paper roll 1 and the path of the sheets separated from said web change their directions but the individual sheets (III, Fig. 1) are introduced into the other portion of the machine at an angle which can be changed and depends on the contour of the envelope blank. The width of the web 2 also depends on the contour of the blank and the adjustment of the said angle is always such that diagonals drawn between the peaks of the bottom and closure flaps 5 and 6 (III, Fig. 1) run parallel to the direction of feed of the blank in the second portion of the machine (IV to XIII, Fig. 1).

In the operation of the machine, the pair of pulling rolls 12, 13 unwind the web 2 (Fig. 2) from the roll 1.

In the example shown in the drawing (Figs. 2 to 5) it is assumed that the envelopes are provided with only an outer printing. This is effected by the printing mechanism comprising an impression cylinder 14, a plate cylinder 15, an ink-applying cylinder 16, and inking cylinder 17 which rotates in the ink trough, the web 2 being conducted to the printing mechanism by guide rolls 18, 19 and 20. The printed web 2, emerging from the printing mechanism, is fed by guide rolls 21 and 22 to the said pulling cylinders 12, 13 and from there to the pair of conveying cylinders 23, 24. The web is then taken over by the pair of cylinders 25, 26, which cut the sheets (III, Fig. 1) of the size and shape required for the envelope blank. For this purpose the lower cylinder 25 is provided with a blade 27 running along a helix of large pitch while the upper cylinder 26 is provided on its periphery with a hardened steel insert 28. These cylinders 25 and 26 are replaceable since their peripheries must exactly correspond to the length of the sheets being cut from the web, measured in the direction of the feed. The gear on the shaft of the lower cylinder 25 and serving for its drive, and the gears transmitting the drive between the two cylinders 25 and 26 may also be replaced so that they may correspond to the cylinder diameters. The sheet cut from the web in the manner described is taken over by the pair of cylinders 29, 30, which serve to completely separate the cut sheets from the web. For this reason cylinders 29, 30 have a larger diameter than the cutting cylinders 25, 26 but feed one sheet for each revolution, thus obtaining the higher conveying speed necessary for the separation of the sheet from the web. The cylinders 29, 30 also serve as delivery cylinders to transfer the sheets to the first pair of cylinders 31, 32 indicated in dotted lines in Fig. 2. For the regulation of this transfer to the new feed direction, both cylinders 29 and 30 are adjustable in their peripheral direction on their shafts and are formed as segment cylinders with recesses in their surfaces. If the recess of one cylinder, for example the upper cylinder 30, is facing the solid surface of lower cylinder 29, the sheet can enter freely between the two cylinders and is only grasped and conveyed further at an exactly predetermined place by the trailing recess edge of the upper cylinder 30. Similarly, the sheet can be suddenly released again by a corresponding adjustment of the lower cylinder 29 after it has arrived, with an exactly predetermined line of its surface, in the line of contact of the two cylinders, this taking place when the leading recess edge of the lower cylinder 30 reaches it.

At the time when the transfer cylinders 29, 30 release the sheet, the first pair of cylinders 31, 32 (Fig. 3) of the new feed direction applicable to the remaining portion of the machine grasps the sheet. The upper cylinder 32 is formed as a segment cylinder by a recess in its surface and is adjustable in the peripheral direction on its shaft. Its adjustment is so effected that the sheet fed by cylinders 29, 30 can, due to the recess in cylinder 32, enter freely between said cylinder and its counter-roll 31 and then be grasped between the trailing recess edge and the surface of the counter-roll at the same time as cylinder 29, 30 release it.

Figure 6:
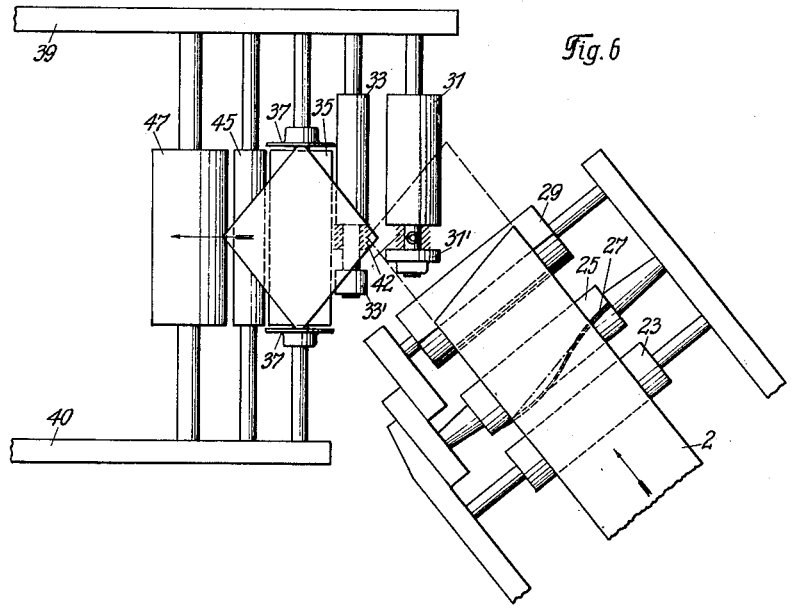
Fig. 6 is a plan view of the means for the transfer of the blanks from the portion of the machine shown in Fig. 2 to the portion shown in Figs. 3–5.

In Fig. 6, this transfer of the sheet from the one direction of conveyance to the other is shown in plan view. In this figure, only the lower cylinders are shown. When the leading end of the web 2 has reached the position shown in dotted lines between the cylinders 29, 30, knife 27 of cylinder 25 begins to cut the sheet in accordance with the dot-and-dash line, and the sheet is then grasped between cylinders 29, 30 and is separated from the web 2 and delivered to cylinders 31, 32. In order that the transfer from one direction of conveyance into the other may be effected regardless of the size of the sheet, it is necessary that the pairs of cylinders 29, 30 and 31, 32 lie sufficiently close to each other. Each of the pairs of cylinders 31, 32 and 33, 34 consist of a short and a long part, the short parts of which are designated 31' and 33' in Fig. 6. While the other cylinders of the second direction of feed are all supported in the main frames 39 and 40, the shafts of cylinders 31, 32 and 33, 34 are supported only on the one side in the main frame 39, while on the other side they are supported in auxiliary frames 41 and 42, which are shown in dotted lines in Fig. 3, and are carried by the brackets 43 and 44, secured to the two main frames.

Figure 3:
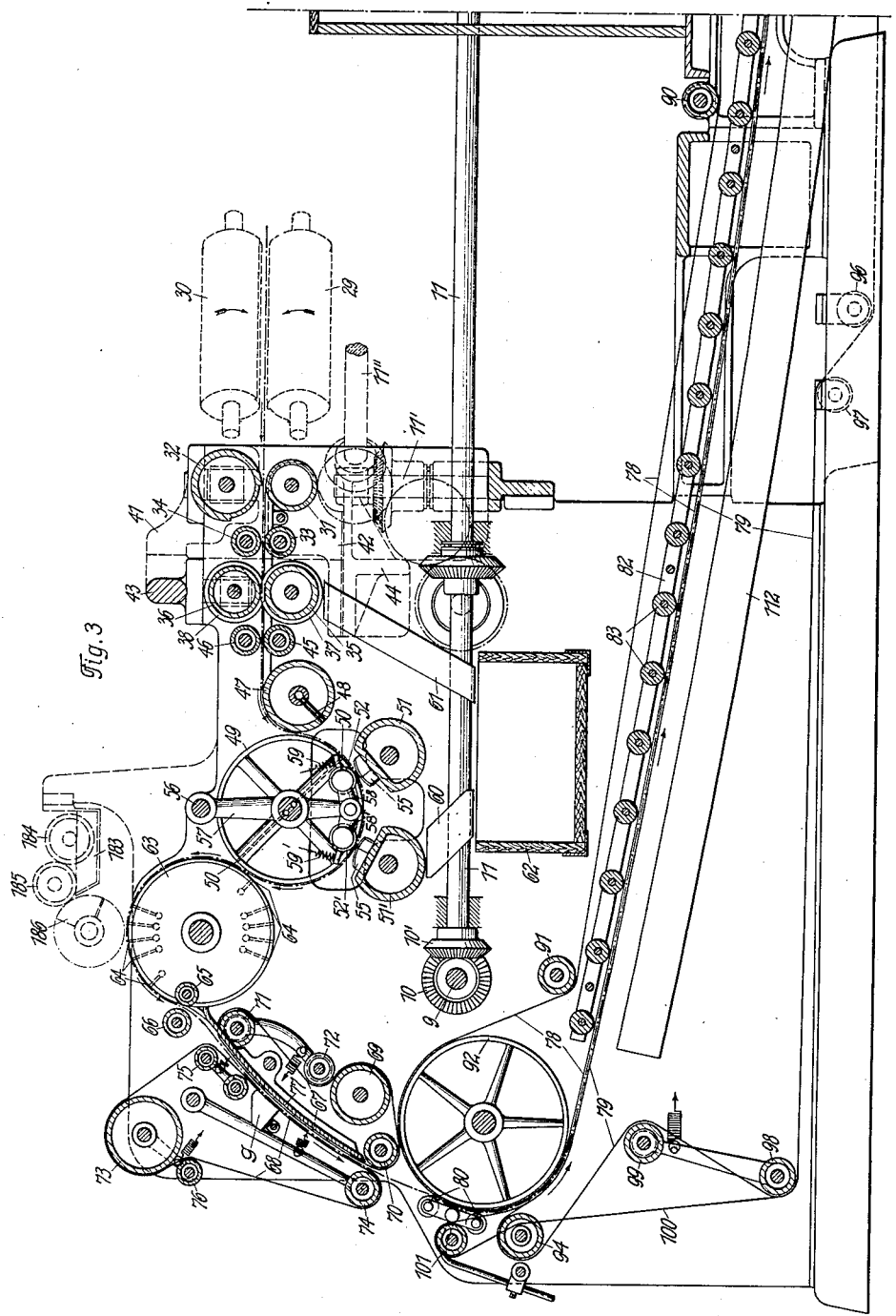
Figs. 3 to 5 are vertical longitudinal sections of the second portion of the machine, Fig. 3 showing the left-hand part, Fig. 4 showing the medial part, and Fig. 5 showing the right-hand part thereof.

Fig. 6 also shows the fulcrum for that portion of the machine which includes in it the means for the first direction of feed of the web and of the sheets cut from it. This fulcrum is designated by a small circle drawn with double outline which lies between the cylinder parts 31 and 31' in the center line of their shaft, and permits the necessary adjustment for different shapes and sizes of envelopes. Fig. 3 shows in dotted lines how a vertical shaft 11' arranged at said fulcrum point is driven from the longitudinal shaft 11 by bevel and spur gears and how a second longitudinal shaft 11'' is driven by said first longitudinal shaft 11 by means of which second longitudinal shaft the cylinders belonging to the swingable portion of the machine receive their drive.

The sheet travels from the transfer cylinders 31, 32 (Fig. 3) by means of conveyor cylinders 33, 34, to the pair of cylinders 35, 36. The latter also serve for the conveying of the sheet, but on each side of each cylinder there is arranged on its shaft a circular cutter 37, 38 which is adjustable axially of the shaft (see also Fig. 6). These pairs of circular cutters 37, 38 cut the side flap ends or peaks 3 (V, Fig. 1) or (as assumed in this figure) only one of said ends or peaks. The conveying cylinders 45, 46 then take over the sheet and transfer it to cylinder 47 (Fig. 3) which grips it by suction by means of the openings 48 in its surface, and transfers it to the conveying discs 49, a plurality of which are arranged alongside of each other on a common shaft. One or more of the discs 49 grip the sheep in its central part by suction through suction openings 50 and convey it so that the parts in which the fold corners 4 are located (VI, Fig. 1) are passed between cylinders 51 and 51', and their small counter-rollers 52 and 52' respectively arranged on both sides of the conveying discs 49, and the blank is thus provided with the fold corners or recesses 4. For this purpose, cylinders 51 and 51' each carry two knives 55 and the small counter-rollers 52 and 52' are of hardened steel. For supporting the counter-rollers 52 and 52', arms 57 are arranged on both sides of the conveyor discs 49 on their shaft and on a cross member 56 fastened to the two side frames of the machine, which arms bear at their lower ends the swingable levers 58 and 58' for the supporting of the counter-rolls 52 and 52'. Compression springs 59 and 59' press the supporting levers 58 and 58' toward the cutting cylinders 51 and 51' and against locknuts (not shown) of stop-pins so that when the punching knife 55 rolls on the peripheries of the counter-rollers 52 and 52', the necessary pressure for the stamping out of the fold corners 4 is assured. The paper cuttings produced by the cutting off of the side flap ends or peaks 3 and the stamping out of the fold corners or recesses 4, pass by chutes 60 and 61 into a collector 62 for which purpose suction means can also be used. Cylinders 47, 51 and 51' have one rotation for each sheet fed, while conveyor discs 49 feed two sheets for each rotation.

The sheet now has the final contour of a blank, and the next step is the application of the closure-flap gumming. To effect this gumming in accordance with the wiping or rolling method which is the more advantageous, the blank is transferred from the conveyor discs 49 to the discs 63 which grip it by means of suction openings 64 and feed two blanks for each rotation.

These discs 63 feed the blanks between the pair of conveying cylinders 65, 66 which maintain the existing conveying speed and feed the blanks between the pairs of conveyor belts 67, 68 which are driven so slowly that the blanks are assembled in overlapping relation between them below and behind each other as shown at VII, Fig. 1. Accordingly, each blank fed by the pair of cylinders 65, 66 is shifted under those already arranged between the belts 67, 68, so that the trailing edges of the closure-flaps are stepped and spaced from each other by an amount corresponding to the desired gumming width.

The lower belts 67 are driven by cylinder 69 and pass over the guide rollers 70, 71, and over tensioning roller 72. The upper belts 68 are driven by cylinder 73, and are conducted over rollers 74, 75, 76, the last-mentioned roller serving as a tensioning roller. The belts 67 and 68 pass jointly over the arched guide-plate 77 and receive the stepped blanks between them and convey the blanks below the gum-container g which applies the gum over the exposed closure-flap edges.

Figure 4:
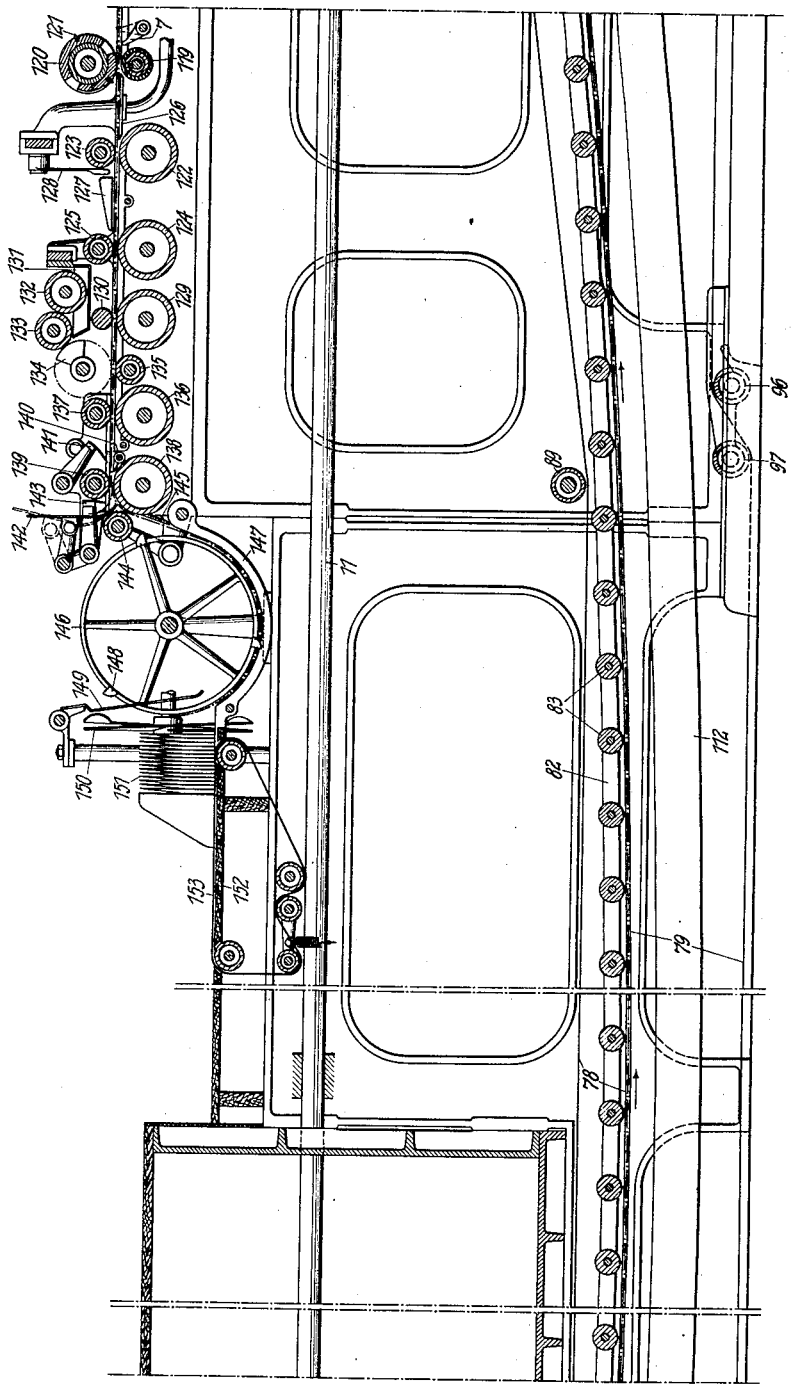
Figure 5:
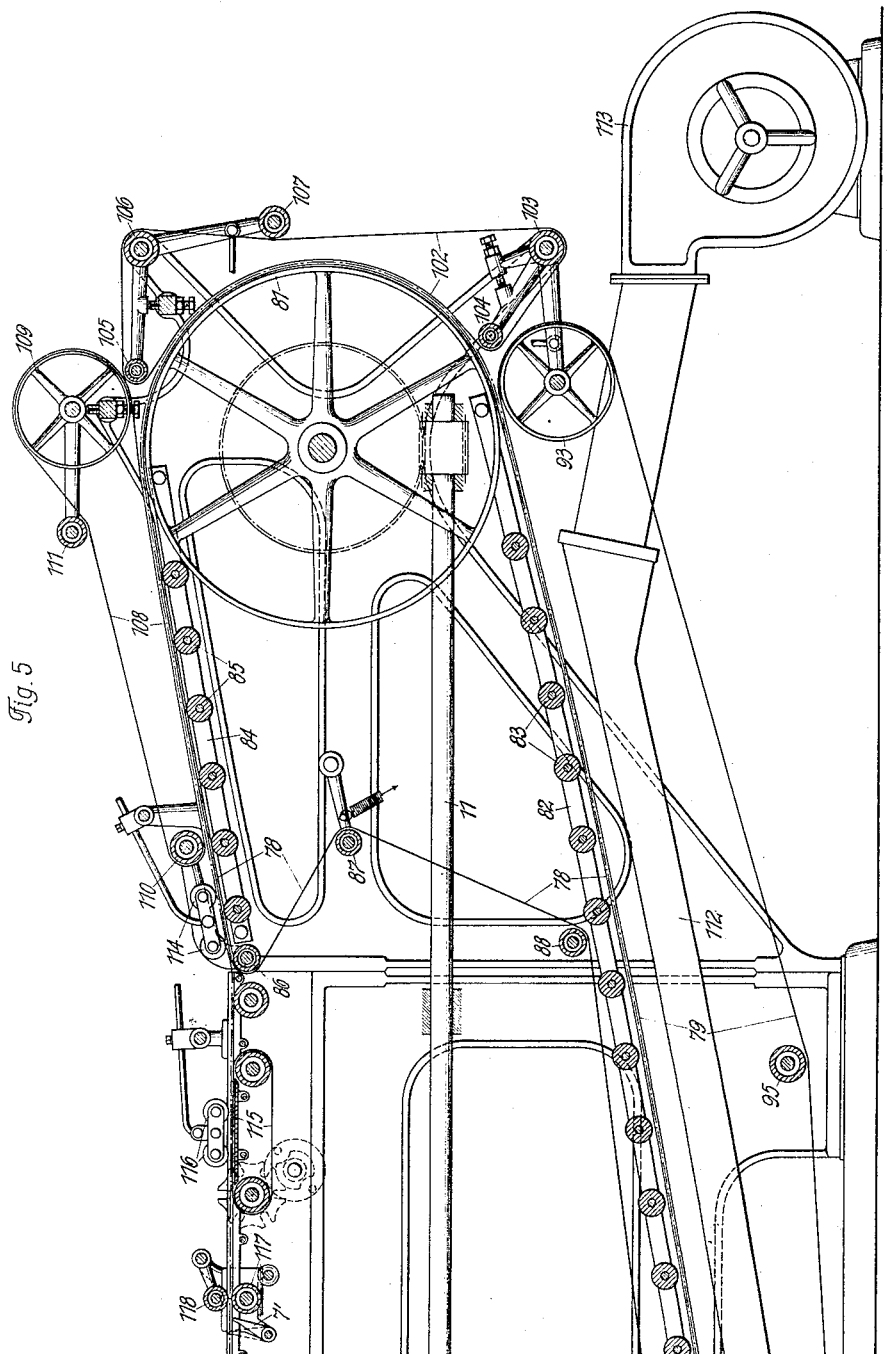

The stepped blanks provided with the gum-coating are discharged between the belt guide rollers 70 and 74 from the gumming-belts 67, 68, and are taken over by the pairs of conveying belts 78, 79 which feed through the channel for the drying of the gum (Figs. 3 to 5). The auxiliary rollers 80 assist the introduction of the blanks between these pairs of belts (Fig. 3). The conveying belt 78 is driven by the belt-drum 81 (Fig. 5) at a speed which is only slightly higher than that of the pairs of gumming belts 67, 68, so that the distance between the trailing edges of the blanks is increased to a small extent so that the edges of the gummed closure-flaps cannot adhere together during the drying of the gum-coating. The belts 78 are led over the guide rollers 83, supported on a frame 82 (Figs. 3 to 5), over the aforesaid belt-drum 81, over the rollers 85 (Fig. 5) supported on frame 84, over the individual guide or tensioning rollers 86, 87, 88 (Fig. 5), 89 (Fig. 4), 90, 91, as well as over the guide-drum 92 (Fig. 3). Belts 79 of the pair of guide-belts 78, 79 are driven by the drum 93 (Fig. 5). The path of said belts 79 to this drum 93 extends from the guide-roller 94 (Fig. 3) jointly with belts 78 over the guide-rollers 83 (Figs. 3 to 5), carried by frame 82, while their return path extends over the individual rollers 95 (Fig. 5), 96, 97 (Fig. 4), 98 and the tensioning roller 99 (Fig. 3). The same path is taken by a cord 100 which runs over the ends or tips of the gummed closure-flaps but which is conducted at drum 92 by a spread tensioning roller 101 (Fig. 3).

While belts 78 are carried without interruption on their blank-conveying path from drum 92 (Fig. 3) to the return roller 86 (Fig. 5), belts 79, after their return by their driving drum 93, for the purpose of a uniform and dependable guiding of the stepped blanks, are replaced over drum 81 (Fig. 5) by other upper belts, namely, first of all, by belts 102. The belts 102 run, however, over a part of the periphery of drum 81, are driven by rollers 103 and assume, in addition, their path over guide rollers 104, 105, 106, as well as over tensioning roller 107. Additional upper belts 108 receive their drive through drum 109. They are further conducted over guide rollers 85 on frame 84 (Fig. 5) over the guide and reversing-roller 110 and over the tensioning-roller 111.

Along the path of the pair of belts 78, 79 over the guide-rollers 83 (Figs. 3 to 5) arranged on frame 82, there extends a channel 112 connected to a blower 113 which supplies it with hot air which flows from a plurality of openings in the upper wall in the channel against the gum-coating on the blanks arranged in the pairs of conveyor belts 78, 79 and thus accelerates the drying.

The stepped blanks discharging at the reversing-roller 110 below belts 108 while remaining on belts 78, pass below rollers 114 which can be so adjusted that they release the leading and topmost blank of the stepped pile at the time when it is grasped between the intermittently driven conveyor belt 115 and the counter-rollers 116 running thereon. The conveyor belt 115 moves with such a speed that, although the blanks remain stepped, the distance between the leading edges of adjacent blanks is considerably increased. From these blanks, the foremost and topmost blank is then completely withdrawn by the rapidly driven pair of cylinders 117, 118, which are adjustable in the direction of feed, and are conducted to the straightening point where these cylinders 117, 118 release the sheet at the moment when the two leading fold corners or recesses 4 have come to within a short distance from the front pair of straightening fingers 7 (Figs. 4 and 5; Fig. 1, VIII). At this moment, the rear pair of straightening fingers 7' swing into the two rear fold corners or recesses 4 and may so displace the blank that its four fold corners 4 come to rest exactly between the four straightening fingers 7 and 7'. The blanks are thus accurately placed between the aligning or regulating gauges 7 and 7' which can be adjusted to suit the size and shape of the blanks being handled. In this way, the following preparatory steps, as well as the folding and gumming proper of the envelope can be effected with the required accuracy. At the beginning of the said straightening process, the leading bottom flap 5 has already freely entered with its end or tip between the pair of cylinders 119, 120, since the upper cylinder 120 has a recess in its periphery to permit such free introduction. Between the trailing recess edge and the counter-cylinder 119, the blank is then grasped at a given place and conveyed further. The scoring-knife 121 of cylinder 120, provides the scoring for the fold lines 5' and 6' of the bottom and closure flap folds (IX, Fig. 1). The two scoring knives 121 are each carried by a separate segment and these two segments, which together form the cylinder 120, are adjustable with respect to each other in the peripheral direction. Their adjustment is so effected that the blank passing between the two cylinders 119, 120 receives the scoring of fold lines 5' and 6' at the correct places. The lower cylinder 119 is provided with a rubber blanket for the production of the fold scoring.

In passage of the blank from the pair of cylinders 119, 120 to the next pairs of cylinders 122, 123 and 124, 125, it runs under a pair of folding devices (not shown in the drawing) having two rails so adjustable transversely to the direction of feed that the distance between their outer edges corresponds to the blank width determined by the two lateral side-flap fold lines 8' (IX, Fig. 1). Along the outer edges of these folding devices, the side flaps 8 are first bent up by a pair of rails 126 which are caused to swing back and forth and are thereupon bent down over the aforementioned folding devices between the pairs of cylinders 122, 123 and 124, 125 by a pair of pushers 127 reciprocating in the transverse direction. This turning down of the side flaps is assisted by a pair of arms 128 which swing transversely to the path of the blank and which assist in overcoming the air resistance encountered in the turning down of the said flaps. In front of the pair of cylinders 124, 125, the blank emerges from the folding devices and the folds of the side flaps are firmly pressed down by its passage between these cylinders.

The envelope has now reached the stage of manufacture shown in Fig. 1, X and it then passes through the pair of conveyor cylinders 129, 130 to the device which applies to the side flaps 8 the gum for the bottom flap 5. This device consists of the container 131, the scoop cylinder 132, the transfer cylinder 133 and the pair of wings 134 which receive the gum from the cylinder 133 and apply it to the leading marginal edges of the folded-over side flaps 8 when the work-piece passes over the lower cylinder 135. In Fig. 1, XI, these paste applications are designated $k$.

The work-piece is now taken over by the pair of conveyor cylinders 136, 137, the upper cylinder 137 of which is so recessed, or consists of individual parts longitudinally displaceable on the shaft, that the cylinder does not come into contact with the wet gum. This pair of cylinders transfers the work-piece to the pair of conveyor cylinders 138, 139. On its path between the two last-mentioned cylinders 136, 137 and 138, 139, a stop 140 which swings temporarily into the path of the work-piece bends up the scored fold-line 5 of the front leading bottom flap 5, and the swinging knife 141, which engages with a rapid swinging motion at the inside of this fold-line, assures the correct introduction of the fold-line between the pair of cylinders 138, 139 which press the fold of the bottom flap and effect the sealing of the bottom flap 5 to the side flaps 8.

The envelope (XII, Figs. 1) which now passes from the pair of cylinders 138, 139, travels upwards along a guide plate 142 which swings intermittently into the path of the envelope, and behind a swinging insertion blade 143, while the fold of the bottom flap is the leading edge, and the closure flap has not yet been folded. After the guide plate 142 has again swung out into the position shown in dotted line (Fig. 4), the insertion blade 143 swings downwardly so that it engages in the closure flap fold 6' and while reversing the direction of feed, introduces said fold 6' properly between the pair of cylinders 138, 144. The folding of the envelope is thus concluded (XIII, Fig. 1), and it leaves the pair of cylinders 138, 144 with the bottom flap fold 5' now trailing and falls, sliding over plate 145, between a pair of conveying discs 146 and a pair of guide rails 147 arranged concentrically thereto. Each of the conveying discs 146 turns through one third of a revolution for the feeding of each envelope and has three conveying lugs 148. The corresponding lugs 148 on both discs 146 engage the envelope at its trailing edge so that it is pushed between the conveying discs 146 and the guide rails 147. As soon as the said trailing edge has reached the horizontal part of the guide rails 147 (Fig. 4), a swinging rail 149 presses it against the back of a pair of discs 150. Each of these discs is in the form of a double-threaded conveyor worm and both of them together, upon every half revolution, convey one envelope from their rear to their front sides, where the envelopes are collected, standing on edge on their bottom flap folds, and thus forming a horizontal stack 151. They then pass onto a conveyor belt 153, which passes over a delivery table 152, said conveyor belt being driven slowly, corresponding to the increase in the delivery stack 151, so that disturbance in the proper sequence of the envelopes which are rapidly fed one behind the other is avoided.

Figure 2:
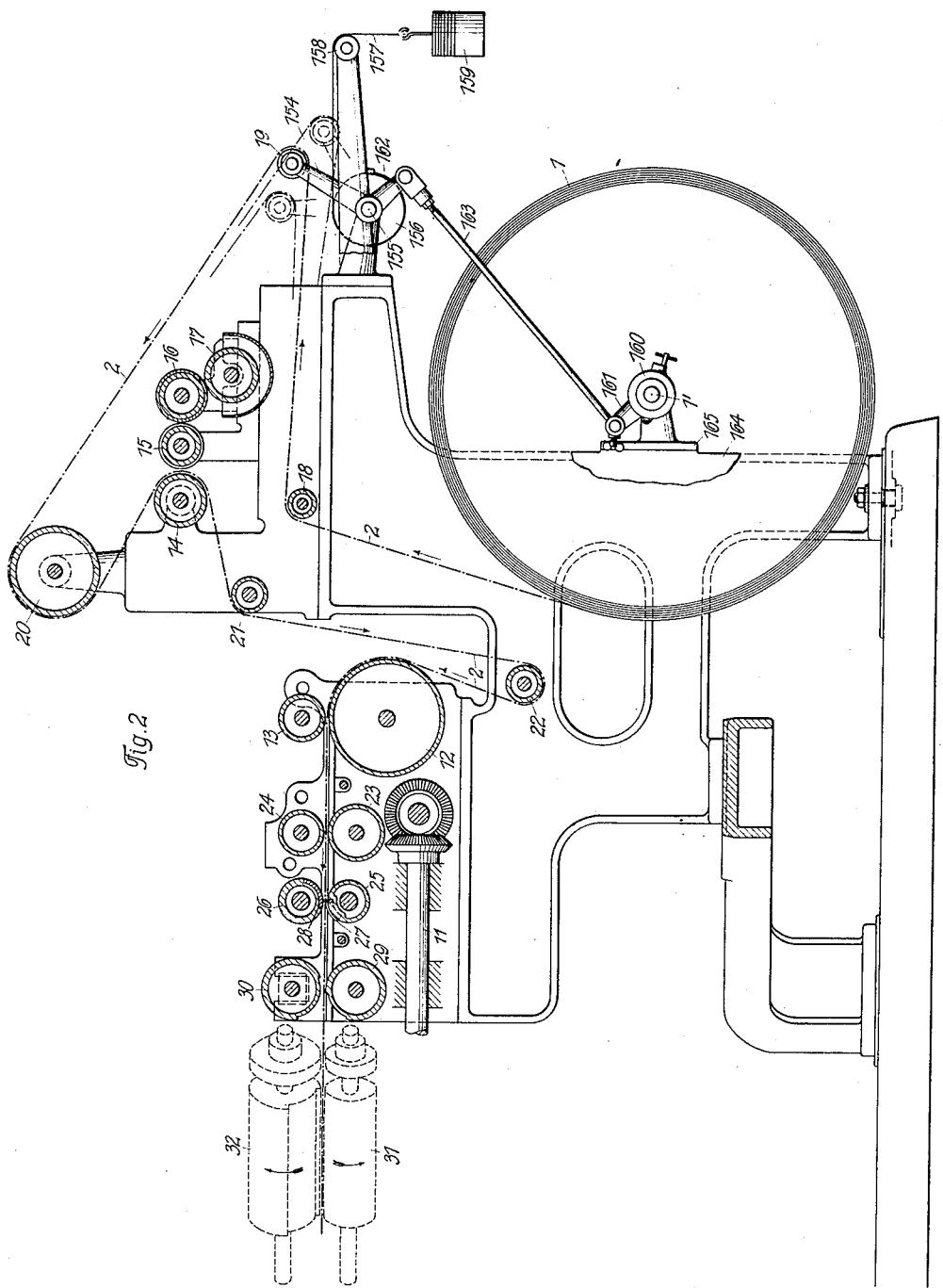
Fig. 2 is a vertical longitudinal section of that portion of the machine which corresponds to stages I to IV of Fig. 1.

Fig. 2 also shows a diagrammatic representation of the paper roll brake for automatically maintaining a uniform tension of the paper web. The web 2 unwinding from the paper roll 1, is guided from the stationary guide roll 18, to the reversing roll 19 supported on a pair of levers 154, and to the roll 20, which is stationary. From here the web passes through the printing mechanism 14 to 17 and over the guide roll 21, to the pair of cylinders 12, 13 which are driven with such a velocity that they always feed the length of web necessary for a blank at the correct time to the pair of cutting cylinders 23, 24 and thus, also to the cutting cylinders 25, 26.

The two levers 154 are fastened jointly to shaft 155 and swing with same within certain limits determined by stops, for instance within 60°. On shaft 155, there is also secured a pulley 156 around which passes a cable 157, one of the ends of which is fastened to said pulley, said cable passes over a guide pulley 158 and carries a weight 159 at its other end. The weight 159 thus tends to turn shaft 155 with the pair of levers 154 in a clockwise direction and accordingly imparts to the paper web 2 a certain tension provided that the shaft 1' of the paper roll is braked to a given extent, and accordingly, the rotation of shaft 1' is correspondingly retarded. The degree of tension of the web is then dependent on weight 159, which acts through pulley 156, and its shaft 155 on the pair of levers 154. By means of individual weight discs which can be added thereto weight 159 can be varied and in this manner the desired tension of the web can be obtained. The roll 19 supported on the pair of levers 154 acts accordingly as a tension roll for the web 2.

On the shaft 1' of the paper roll 1, there is arranged a brake 160. The clockwise swinging of the regulating lever 161 of the brake from the position shown in Fig. 2 reduces its braking action while swinging in the opposite direction increases it. On the shaft 155, there is attached, in addition to the pair of levers 154, another lever 162 which is connected with the regulating lever 161 by a rod 163. If, therefore, the normal tension of the web 2 which has been determined by the weight 159 is reduced, the pair of levers 154, together with the tensioning roll 19, is swung clockwise and the brake-adjusting lever 161 is swung counter-clockwise by the lever 162 and the connecting rod 163, so that brake 160 is applied, and as a result, the web tension is again increased. If, on the other hand, the web tension exceeds the normal tension which has been determined, the web 2 pulls the tensioning roll 19 and the pair of levers 154 which carries it in a counter-clockwise direction so that the adjusting lever 161 is caused to release the brake and the web tension is again reduced.

If the web 2 should tear in the part extending from the roll 1 to the pair of removing cylinders 12, 13, then, since it is only loosely gripped in the printing mechanism, the tension is removed and the tensioning roll 19 is released so that the brake is set at the highest braking stage, at which a rapid complete braking and stopping of the paper roll 1 is effected in a completely automatic manner, independent of the stoppage of the entire machine. If, on the other hand, the entire machine stops for any reason although the paper web has not been torn, the paper roll 1, due to its inertia, continues, so that the web at once loses its tension and the levers 154 again effect a complete braking and stopping of roll 1.

Figure 7:
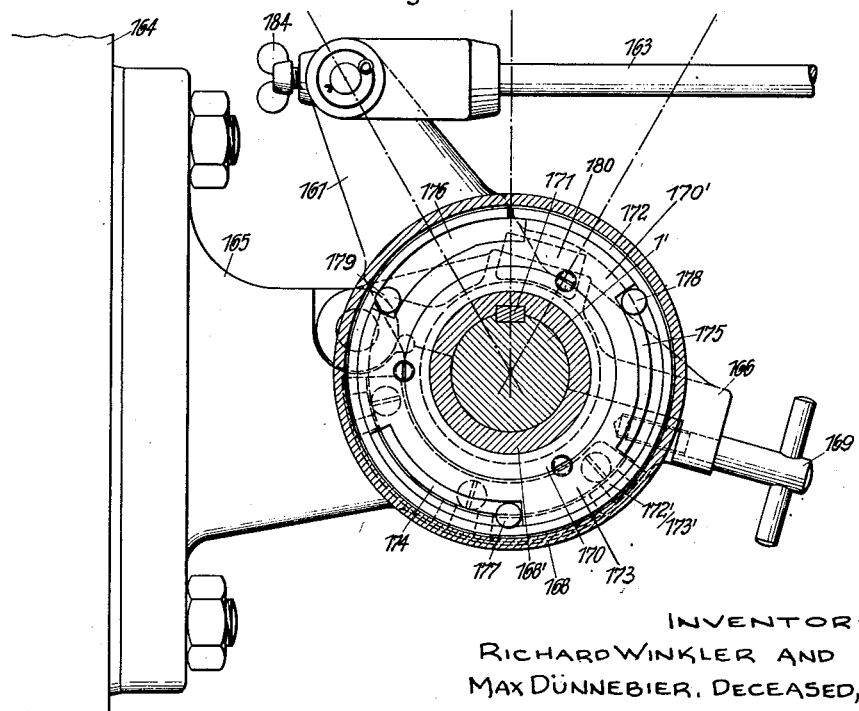
Fig. 7 is a vertical detail cross-section through the paper roll brake with a side view of one bearing of the roll.

Fig. 7 shows details of the roll brake 160.

To the machine frame 164, bearings 165 of the shaft 1' carrying the roll 1 are secured, and these bearings are provided with hinged covers 166 secured in their closed position by a hand screw 167. One end of the shaft 1' extends beyond the bearing 165 of the corresponding machine side, and this free end carries the roll brake. The brake housing 168 is longitudinally displaceable together with an inner hub 168' on the shaft end but is secured against rotation on same by a key 169 so that it rotates together with the shaft 1'. On the inner hub 168' of the brake housing 168, there rotates an adjustable member consisting of two parts 170 and 170', the part 170 bearing the arm 161 serving as the adjusting lever of the brake.

In the brake housing 168, between the inside of its cylindrical outer wall and the surface of part 170, there is located a resilient spring ring 172, the width of which is essentially the same as the depth of the brake housing 168 at its cylindrical outer wall. Over a part of its periphery, however, said ring bears several cam-like projections 172' extending beyond the housing wall, which engage in corresponding recesses 173' arranged in the free outer edge of a segment-shaped part 173 secured to the bearing 165, so that the spring ring 172 is prevented from rotating. If, therefore, the adjusting member 170, 170' is also held fast in a given position by its adjusting lever 161 and shaft 1' is placed in rotation together with the brake housing 168, then the latter rotates together with its inner hub 168' in the adjustment member 170, 170' and with its cylindrical outer wall around the spring ring 172. This rotation of brake housing 168 takes place loosely as long as the spring ring 172 is completely free from tension. If the spring ring, on the other hand, is tensioned, i. e. spread, and thus pressed against the inside of the cylindrical outer wall of the brake housing 168, the rotating brake housing 168, and together with it also the shaft 1', is subjected to a braking force which increases with increasing spread of spring ring 172. In order to obtain a gentle, smooth increase and decrease of the braking action, the following arrangement has been adopted:

In the surface of the adjustment member part 170', there are provided several (three in the example shown in the drawing) uniformly-distributed recesses 174, 175, and 176, and the bottom surface of each of these recesses is not uniformly deep, i. e. it does not extend concentrically but is provided with two steps of different depth, in such a manner that it rises in the same direction in connection with all recesses. Each recess thus has a deeper and a less deep part. If the recesses are compared with each other, however, the deeper parts and also the less deep parts show unequal lengths among each other. In connection with all three recesses in accordance with the drawing, the less deep part of recess 174 is approximately three times as long as in recess 176 and approximately twice as long as in recess 175. In the recesses, there are inserted separate intermediate members 177, 178, and 179, in such a manner that, for a given position of the adjustment member 170, 170', said intermediate members are located directly at the deeper end of the recess and that, when the spring ring 172 is completely without tension, they contact the bottoms of the recesses on the one hand, and lie in transverse notches of the spring ring 172 on the other hand.

What we claim is:

1. A method for the manufacture of envelopes, with gummed closure flaps, from a paper web fed from a roll, which comprises unwinding the web from the roll and simultaneously cutting the web into sheets to form blanks each contained within four straight uninterrupted edges, while the web and the said blanks are conveyed in a common linear path, then directly transferring said blanks successively to a second linear path disposed at an obtuse angle to said common path and parallel to lines extending through the blank extremities forming the tips of the bottom and closure flaps of the envelopes, cutting from each blank at least one of the side flap extremities while the blanks are being conveyed in said second path, then shaping the blanks to form corners for folding the envelope flaps, then arranging the shaped blanks in overlapping relation to each other and applying gum to the exposed edges of the closure flaps of the blanks, and then separating the still unfolded blanks from each other and gumming and folding the blanks to form the finished envelopes.

2. A method according to claim 1, in which the shaped blanks, with the gum applied to the exposed surfaces of the closure flaps, are moved relatively to each other to separate the gummed surfaces before conveyance of the blanks through the drying channel, the distance between the closure flap edges on adjacent blanks being increased to prevent adjacent flaps from adhering to each other while the blanks still remain in over-lapping relation.

3. A method according to claim 1, in which the web and the blanks are delivered directly to the said second path which is disposed at a variable angle to the said common path.

4. A method according to claim 1, in which the web is printed on at least one side after withdrawal from the roll and before the individual sheets are cut therefrom.

5. A machine for the manufacture of envelopes with gummed closure flaps, from a paper web fed from a roll, comprising means for drawing the web from its roll, means for cutting the web along straight uninterrupted parallel lines extending from edge to edge of the web to separate the web into blanks while the web and the blanks are conveyed in a common linear path, roller means for spacing the separated blanks from each other while still in said path, rolls for receiving the blanks in said path and for conveying the blanks in a second linear path disposed at an obtuse angle to said common path, said receiving rolls being arranged with axes arranged at right angles to said second path, means for conveying the blanks successively in said second path, means in said second path for cutting from each blank at least one of the side flap extremities, means for shaping the separated blanks in said second path to form corners for the folding of the envelope flaps, means in said second path for arranging the shaped blanks in overlapping relation to each other, means for applying gum to the exposed edges of the closure flaps of the overlapping blanks, means for conveying the overlapping blanks through a gum drying zone, means for re-receiving the blanks from the said zone and for separating the still unfolded blanks from each other, and means for gumming and folding the blanks to form the finished envelopes.

6. A machine according to claim 5 comprising a frame for supporting the said means for conveying the web and the blanks in said common path, said frame being mounted for adjustment about a vertical axis to vary the angular disposition of said paths to suit the contour of the blanks being handled.

7. A machine according to claim 5, comprising pairs of conveyer belts for conveying the stepped blanks during the application of the gum and during the drying of the closure flaps.

8. A machine according to claim 5, comprising means for increasing the distances between the adjacent edges of the closure flaps in the overlapping assembly after the application of the closure gum and before conveyance through the drying channel, to prevent the adjacent flaps from adhering to each other.

9. A machine according to claim 5, comprising means for drying the gum in at least a part of said drying channel.

10. A machine according to claim 5, in which the means for separating the stepped assembly of blanks comprises means for receiving the leading portion of each blank in the stepped assembly, and for withdrawing said blank from the assembly.

11. A machine according to claim 5, comprising means for scoring the blanks at right angle to the direction of movement of the blanks to form the bottom and closure flaps after the separation of the blanks from their stepped assembly.

12. A machine according to claim 5, comprising means for folding over the side flaps of the work-pieces after the separation of the blanks from their stepped formation, and means for pressing down the folded side flaps.

13. A machine according to claim 5, comprising means for applying gum to the marginal edges of the side flaps for the sealing of the bottom flap of the envelope, and means for folding-over and sealing the said bottom flap by pressing it down upon the side flaps.

14. A machine according to claim 5, comprising means for folding-over the closure flap after the drying of the gum thereon, and the separation of the blanks from the stepped assembly.

15. A machine according to claim 5, comprising means for receiving the manufactured envelopes, and means for delivering them from said receiving means in finished form.

16. A machine according to claim 5, comprising means for printing upon at least one side of the web in at least one color after unwinding of the web from the roll and before the individual blanks are cut from the roll.

17. A machine for making envelopes from a web of paper fed from a roll, comprising means for drawing the web from the roll, means for cutting the web to form separate sheets with straight cut edges, means for separating the cut blanks, recessed roller means for then gripping one angular side part of each separated sheet and for conveying each sheet directly in a linear path disposed at an obtuse angle to the direction of feed of the web, and means for varying the said angle to suit the contour of the blanks.

18. A machine for making envelopes from a web of paper fed from a roll, comprising roller means for cutting the web to form separate straight edged sheets, means for printing upon at least one side of the web before the said cutting operation, recessed roller means for receiving and gripping one corner of each separated sheet and for conveying each sheet in a linear path disposed at an angle to the direction of feed of the web, rotary means for then cutting the ends from the extremities of the parts of the sheets to form at least one of the side flaps of each envelope, means for cutting out the corners to form envelope blanks, means for assembling the blanks in over-lapping stepped relation with the marginal edges of the closure flap portions exposed, means for applying gum to said marginal edges by the roller method, means for separating the gummed marginal edges in the stepped assembly to prevent the gummed surfaces from adhering to each other, a drying channel for the stepped sheets, means for conveying the blanks through said channel, means for successively separating the blanks after delivery from said channel, means for gumming the blanks for the sealing of the side and bottom flaps of the envelope, means for folding and sealing the side and bottom flaps and means for closing the closure flap and delivering the finished envelopes.

References Cited in the file of this patent

UNITED STATES PATENTS

| Number | Name | Date |
|--------|------|------|
| 1,291,089 | Novick | Jan. 14, 1919 |
| 1,606,554 | Wycherley | Nov. 9, 1926 |
| 1,691,027 | Novick | Nov. 6, 1928 |
| 2,119,951 | Dunnebier | June 7, 1938 |
| 2,268,610 | Miller | Jan. 6, 1942 |
| 2,323,219 | Hayes | June 29, 1943 |